(12) United States Patent  
Kim

(10) Patent No.: US 9,574,636 B2
(45) Date of Patent: Feb. 21, 2017

(54) ELECTRONIC SEMI ACTIVE CONTROL ENGINE MOUNT HAVING VARIABLE AIR CHAMBER

(71) Applicant: HYUNDAI MOTOR COMPANY, Seoul (KR)

(72) Inventor: Seung-Won Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/716,839

(22) Filed: May 19, 2015

(65) Prior Publication Data
US 2016/0123426 A1    May 5, 2016

(30) Foreign Application Priority Data
Nov. 4, 2014    (KR) .................. 10-2014-0152031

(51) Int. Cl.
| F16F 13/00 | (2006.01) |
| F16F 13/10 | (2006.01) |
| F16F 13/26 | (2006.01) |
| B60K 5/12  | (2006.01) |

(52) U.S. Cl.
CPC ........... *F16F 13/002* (2013.01); *B60K 5/1283* (2013.01); *F16F 13/10* (2013.01); *F16F 13/26* (2013.01)

(58) Field of Classification Search
CPC .......... F16F 13/002; F16F 13/26; F16F 13/10; B60K 5/1283
USPC ............. 267/140.14, 140.13, 140.15, 140.11
See application file for complete search history.

(56) References Cited

U.S. PATENT DOCUMENTS

| 5,213,315 A | 5/1993 | Hartel et al. | |
| 6,386,527 B2 * | 5/2002 | Oberle | F16F 13/103 267/140.13 |
| 6,422,545 B1 * | 7/2002 | Baudendistel | F16F 13/268 267/140.13 |
| 7,188,830 B2 * | 3/2007 | Kato | F16F 13/106 267/140.14 |
| 8,333,368 B2 * | 12/2012 | Rooke | F16F 13/102 188/282.6 |
| 8,714,530 B2 * | 5/2014 | Kanaya | F16F 13/106 267/140.11 |

(Continued)

FOREIGN PATENT DOCUMENTS

| JP | 62-127538 A | 6/1987 |
| JP | 04-171331 A | 6/1992 |

(Continued)

*Primary Examiner* — Thomas J Williams
*Assistant Examiner* — Mariano Sy
(74) *Attorney, Agent, or Firm* — McDermott Will & Emery LLP

(57) ABSTRACT

An electronic semi active control engine mount having a variable air chamber includes a variable air chamber diaphragm that absorbs the exciting force of fluid due to an external force by elastically deforming. An air chamber supports the variable air chamber diaphragm with the atmospheric pressure. A fork is separated from the diaphragm to keep the air chamber into which air flows in idling of an engine, and comes in close contact with the variable air chamber diaphragm to remove the air chamber into which the air flows when a vehicle is driven. An actuator either separates the fork from the variable air chamber diaphragm or allows the fork to be in close contact with the variable air chamber diaphragm.

14 Claims, 8 Drawing Sheets

(56) References Cited

U.S. PATENT DOCUMENTS

| | | | | |
|---|---|---|---|---|
| 9,016,674 B2* | 4/2015 | Kim | .......................... | F16F 6/00 |
| | | | | 267/140.14 |
| 2003/0030203 A1* | 2/2003 | Nemoto | ................. | F16F 13/26 |
| | | | | 267/140.14 |
| 2007/0222128 A1* | 9/2007 | Ichikawa | ................ | F16F 13/26 |
| | | | | 267/140.14 |
| 2008/0136074 A1* | 6/2008 | Nemoto | ................. | F16F 13/26 |
| | | | | 267/140.14 |
| 2009/0009009 A1* | 1/2009 | Kon | ....................... | F16F 13/26 |
| | | | | 310/20 |
| 2013/0001843 A1* | 1/2013 | Kanaya | ................ | F16F 13/106 |
| | | | | 267/140.14 |
| 2016/0001648 A1* | 1/2016 | Kim | ..................... | F16F 13/002 |
| | | | | 248/566 |

FOREIGN PATENT DOCUMENTS

| | | |
|---|---|---|
| JP | 2003-148550 A | 5/2003 |
| JP | 2010-249288 A | 11/2010 |
| JP | 2013-011314 A | 1/2013 |
| KR | 10-2009-0032018 A | 3/2009 |
| KR | 10-2013-0003749 A | 1/2013 |

* cited by examiner

ELECTRONIC SEMI ACTIVE CONTROL ENGINE MOUNT HAVING VARIABLE AIR CHAMBER

CROSS-REFERENCE TO RELATED APPLICATIONS

This application claims the benefit of priority to Korean Patent Application No. 10-2014-0152031, filed on Nov. 4, 2014, which is incorporated herein by reference in its entirety.

TECHNICAL FIELD

The present disclosure relates to an electronic semi active control engine mount, and more particularly, to an electronic semi active control engine mount having a variable air chamber that can increase a rate of change of dynamic characteristics and a loss factor by removing an air chamber in traveling.

BACKGROUND

A vehicle is equipped with a semi active control (SAC) engine mount disposed between an engine or a powertrain and a car body to effectively reduce vibration, which occurs during the operation of the engine, by turning on/off dynamic characteristics.

The SAC engine mount has an air chamber that is connected to an air supply channel together with an internal channel connecting first and second fluid chambers which are divided by a diaphragm, and the SAC engine mount can change the dynamic characteristic. The SAC engine mount is largely classified into a by-pass type vacuum negative pressure SAC engine mount controlling an internal channel and a volume-stiffness (VS) type electronic SAC engine mount controlling the internal channel using an electronic solenoid valve.

The above electronic SAC engine mounts do not generate dynamic characteristic shoot-up during idling of the engine, thus maintaining steadiness against oscillation of the vehicle. In particular, since the electronic solenoid valve controls the SAC engine mount, the air chamber of the electronic SAC engine mount discharges air during idling in an open condition and keeps the air during traveling of the vehicle in a closed condition.

However, since the air chamber of the electronic SAC engine mount, which is closed to block the air during the traveling of the vehicle, supports an exciting force and interferes with a flow of fluid, which needs to smoothly flow to the internal channel, due to absorption of the force by the air chamber under air compression, ride-shake performance is deteriorated.

Accordingly, rate of change of the dynamic characteristics and a loss factor become lower in the electronic SAC engine mount than those of the vacuum negative pressure SAC engine mount.

In particular, when the rate of change of dynamic characteristics becomes larger, the loss factor becomes smaller, due to a trade-off relationship between the rate of change of the dynamic characteristics and the loss factor. When the rate of change of the dynamic characteristics is smaller, the loss factor may increase. Thus, many trials and errors are necessary to increase both of the rate of change of dynamic characteristics and the loss factor of the electronic SAC engine mount during the traveling of the vehicle.

SUMMARY

An aspect of the present invention provides an electronic semi active control (SAC) engine mount having a variable air chamber which decreases dynamic characteristics with movement of a diaphragm. The electronic SAC engine absorbs fluid vibration in an upper fluid chamber by forming the variable air chamber due to an inflow of air in idling of an engine. Further, the electronic semi active increases a loss factor using the flow of fluid through an upper fluid chamber and a lower fluid chamber because the diaphragm is fixed by removing the variable air chamber by blocking the air inflow during traveling of a vehicle.

In accordance with an embodiment of the present inventive concept, an electronic semi active control engine mount having a variable air chamber may include a variable air chamber diaphragm that absorbs an exciting force of fluid elastically deforming in which the exciting force occurs due to an external force. The variable air chamber supports the variable air chamber diaphragm with the atmospheric pressure. A fork is separated from the variable air chamber diaphragm to keep the variable air chamber into which air flows during idling of an engine, and comes in close contact with the variable air chamber diaphragm to remove the variable air chamber into which the air flows during traveling of a vehicle. An actuator either separates the fork from the variable air chamber diaphragm or allows the fork to be in close contact with the variable air chamber diaphragm.

The variable air chamber diaphragm may be exposed to an upper fluid chamber to directly receive the exciting force. The fork may be disposed on an air chamber-forming surface recessed on a channel nozzle plate which forms a channel connected from the upper fluid chamber to a lower fluid chamber. The actuator may be disposed under the lower fluid chamber which is blocked by a main diaphragm.

The upper fluid chamber may be surrounded by an upper core with the channel nozzle plate for separating the fluid stored therein. The lower fluid chamber may be surrounded by a lower core coupled to a lower portion of the upper core. The lower core may allow an internal space in which the actuator is disposed to communicate with outside.

The lower core, the channel nozzle plate, and the fork may form an air intake channel connected to the variable air chamber.

The air intake channel may include a fork air hole formed through the fork, an upper air storage stepped from an air chamber-forming surface of the channel nozzle plate, an air intake hole formed through the center of the air chamber-forming surface, a lower air storage under the diaphragm and above the actuator in the internal space of the lower core, and an air intake hole formed at the lower core and communicating with the outside.

The fork may be disposed under the diaphragm and the actuator is disposed under the fork.

The fork and the actuator may be connected by fixing pins. The fixing pins may fix a fork rod integrally formed with the fork and a fork connection rod retracting and stretching into and out of the actuator.

The actuator may be controlled by a controller. The controller may determine whether the engine is in an idling state or the vehicle is in a traveling state based on an engine revolutions per minute (RPM). The actuator may be a solenoid valve.

In accordance with another embodiment of the present inventive concept, an electronic semi active control (SAC) engine mount having a variable air chamber includes upper and lower fluid chambers connected to channels through which a fluid flows. An upper core surrounds the upper fluid chamber, and a lower core surrounds the lower fluid chamber. A channel nozzle plate and a channel nozzle cover are combined with each other to form channels connected to the upper and lower fluid chambers. A main diaphragm separates the lower fluid chamber from the upper fluid chamber in an internal space of the lower core. A mounting housing surrounds the upper and lower cores. A variable air chamber unit forms the variable air chamber to absorb an exciting force of the fluid in the upper fluid chamber during idling of an engine, and removes the variable air chamber to form a flow of the fluid through which the fluid flows to the upper and lower fluid chambers during traveling of a vehicle.

According to the present disclosure, in idling of an engine, a variable air chamber is formed and dynamic characteristics are improved by movement of a diaphragm which absorbs vibration of fluid. When a vehicle is driven, the variable air chamber is removed and a loss factor is increased by a flow of the fluid, thereby achieving an electronic SAC engine mount having a larger rate of change of dynamic characteristics and loss factor. Particularly, the rate of change of dynamic characteristics and the loss factor are at the same level as those of a vacuum negative pressure SAC engine mount, thus improving driving conditions.

Further, since the rate of change of dynamic characteristics and the loss factor are improved by the variable air chamber, it is possible to minimize a change in design of existing electronic SACs having an air chamber, thus reducing costs.

Further, since the variable air chamber is formed or removed by vertical movement of a piston which is connected to a solenoid valve, it is possible to achieve an electronic SAC engine mount having a small-sized solenoid valve.

DETAILED DESCRIPTION

Figure 1:
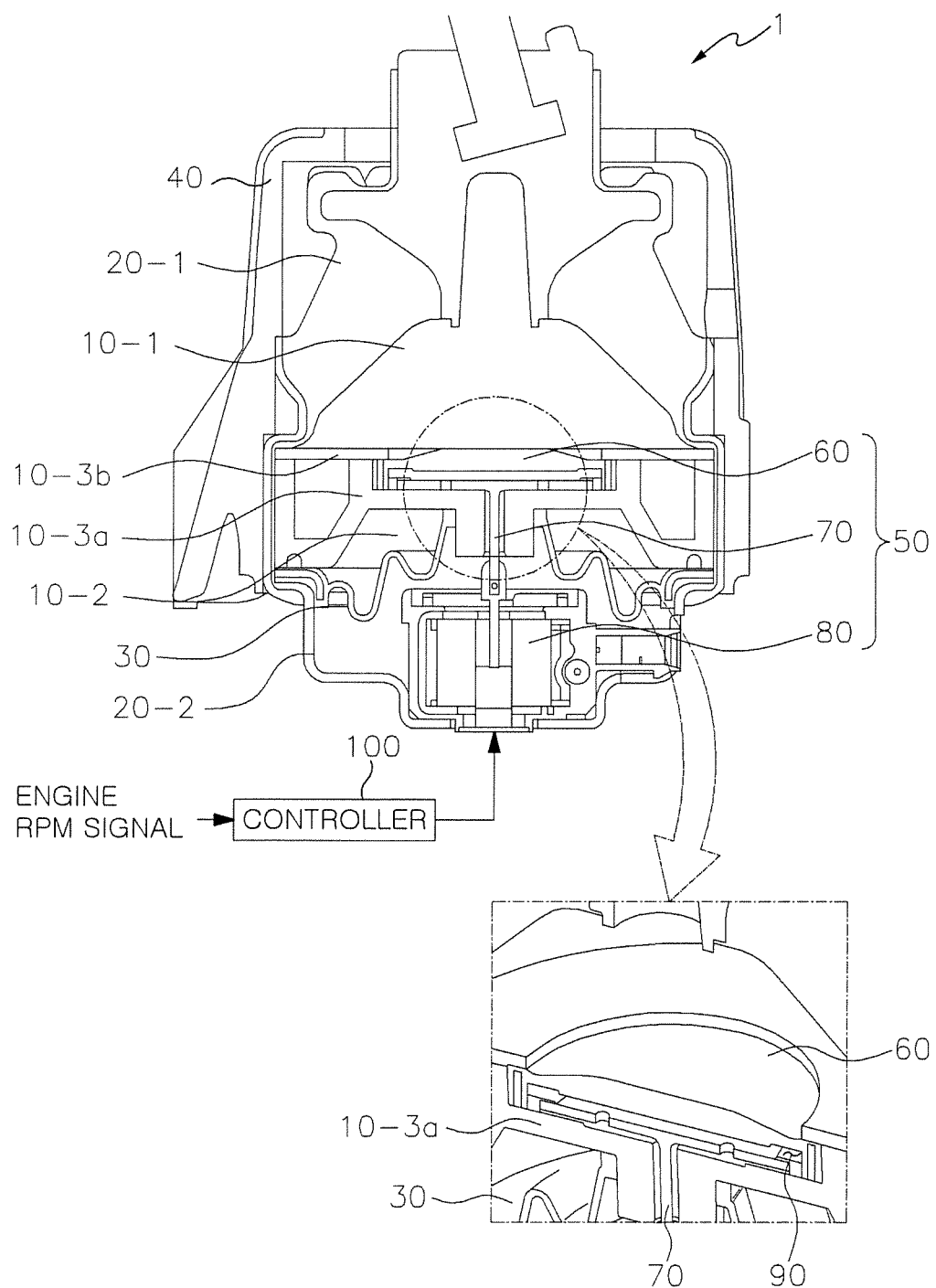
FIG. 1 is a view showing a configuration of an electronic SAC engine mount with a variable air chamber according to the present inventive concept.

FIG. 1 is a view showing a configuration of an electronic SAC engine mount with a variable air chamber according to an embodiment of the present inventive concept.

Referring to FIG. 1, an electronic SAC engine mount 1 includes upper and lower fluid chambers 10-1 and 10-2, a channel nozzle plate 10-3a, a channel nozzle cover 10-3b, upper and lower cores 20-1 and 20-2, a main diaphragm 30, a mounting housing 40, a variable air chamber unit 50 having a variable air chamber 90, and a controller 100 controlling the variable air chamber unit 50 in accordance with engine revolutions per minute (RPM) to form and remove the variable air chamber 90.

The upper and lower fluid chambers 10-1 and 10-2, the channel nozzle plate 10-3a, and the channel nozzle cover 10-3b form a fluid storage in the electronic SAC engine mount 1 and form a fluid circulation structure for improving low-frequency dynamic characteristics. The upper fluid chamber 10-1 and the lower fluid chamber 10-2 keep a fluid which receives an exciting force caused by an external force. The channel nozzle plate 10-3a is disposed under the upper fluid chamber 10-1 to form a fluid channel connected to the upper and lower fluid chambers 10-1 and 10-2 and provides an air chamber-forming space of the variable air chamber unit 50. The channel nozzle cover 10-3b divides an internal space of the electronic SAC engine mount 1 to keep the fluid of the upper fluid chamber 10-1 by covering an open channel of the channel nozzle plate 10-3a.

The upper and lower cores 20-1 and 20-2 and the mounting housing 40 determine an external appearance of the electronic SAC engine mount 1 as a structure to be mounted on an engine (or a powertrain). The upper core 20-1 surrounds the upper fluid chamber 10-1, and the lower core 20-2 surrounds the lower fluid chamber 10-2. In particular, the lower core 20-2 is coupled to an end of the upper core 20-1 to support the channel nozzle plate 10-3a, provides a space for receiving the variable air chamber unit 50, and communicates with outside at an atmospheric pressure to allow air to flow inside the electronic SAC engine mount 1.

The main diaphragm 30 separates the lower fluid chamber 10-2 formed under the channel nozzle plate 10-3a inside the lower core 20-2.

The variable air chamber unit 50 absorbs the exciting force of the fluid in the upper fluid chamber 10-1 by forming the variable air chamber 90 during idling of the engine, and forms a flow of the fluid in the upper and lower fluid chambers 10-1 and 10-2 to the fluid channel of the channel nozzle plate 10-3a by removing the variable air chamber 90 during traveling of a vehicle. Here, the variable air chamber unit 50 includes a variable air chamber diaphragm 60 that moves to absorb the exciting force of the fluid in the upper fluid chamber 10-1 when the variable air chamber 90 is formed. A fork 70 removes the variable air chamber 90 by coming in close contact with the variable air chamber diaphragm 60. An actuator 80 brings the fork 70 in close contact with the variable air chamber diaphragm 60.

The controller 100 receives the engine RPM to control the actuator 80 and outputs a control signal for forming or removing the variable air chamber 90 by determining the idling of the engine and traveling of the vehicle on the basis of the engine RPM. The controller 100 is an engine control unit or electronic control unit (ECU), but may be an exclusive controller or any automotive controller, if necessary.

Figure 2:
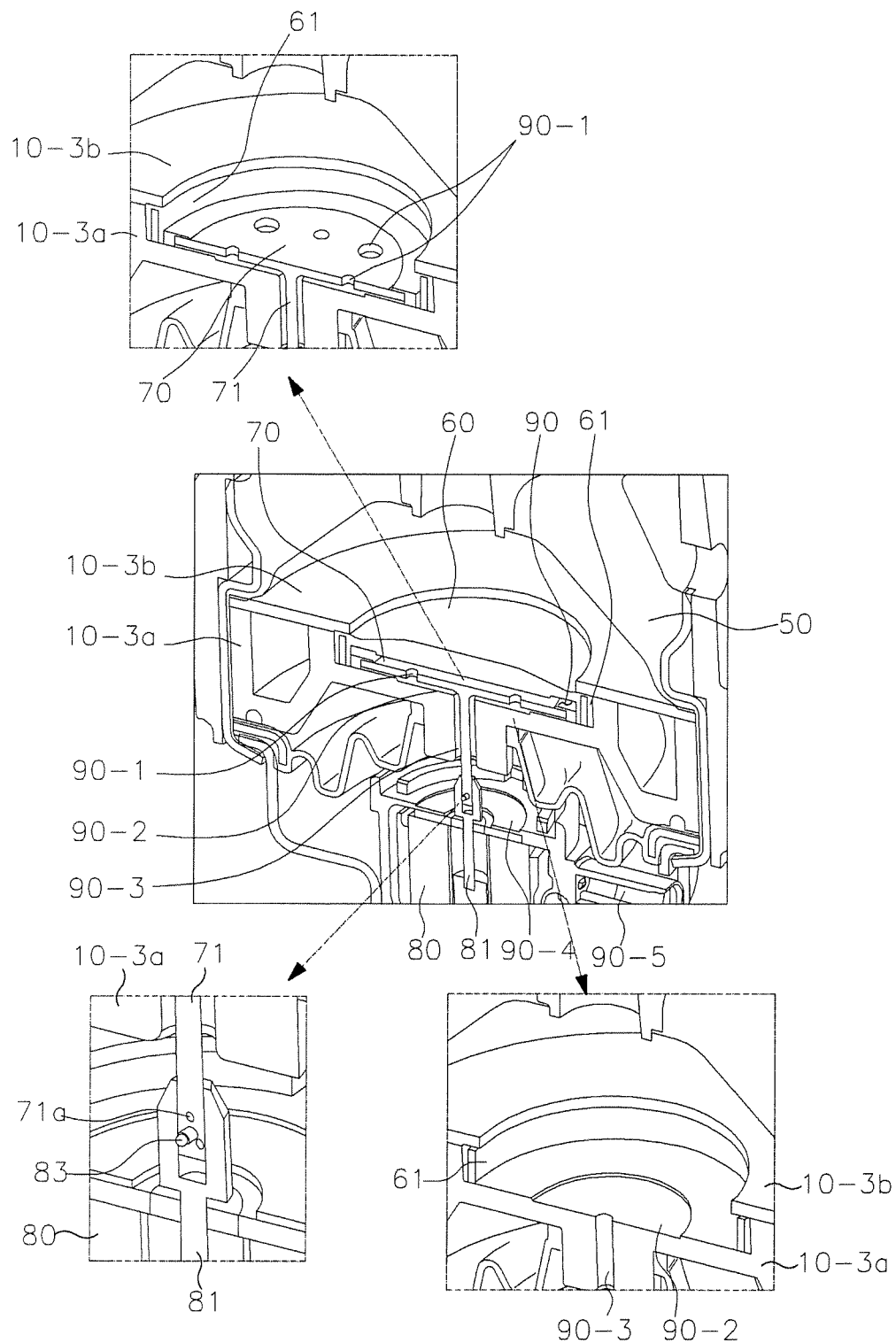
FIG. 2 is a view showing a detailed configuration of a variable air chamber unit according to the present inventive concept.

FIG. 2 shows a detailed configuration of the variable air chamber diaphragm 60, the fork 70, the actuator 80, and the variable air chamber 90 of the variable air chamber unit 50.

As shown in FIG. 2, the fork 70 is disposed under the variable air chamber diaphragm 60, and the actuator 80 is disposed under the fork 70.

In detail, the variable air chamber diaphragm 60 is exposed to the upper fluid chamber 10-1 to directly receive the exciting force applied by the fluid in the upper fluid chamber 10-1. The variable air chamber diaphragm 60 forms an internal space as the variable air chamber 90 using an air chamber flange 61 which is an edge of the variable air chamber diaphragm 60. The variable air chamber diaphragm 60 is made of a material absorbing the exciting force by elastically deforming. In particular, the variable air chamber diaphragm 60 is fixed by the channel nozzle cover 10-3b combined with the channel nozzle plate 10-3a with the air chamber flange 61 on an air chamber-forming surface recessed on the channel nozzle plate 10-3a, and is exposed to the upper fluid chamber 10-1 through a center hole formed through the channel nozzle cover 10-3b.

A disk shape portion of the fork 70 is disposed in the variable air chamber 90, which is formed by the internal space of the variable air chamber diaphragm 60, and is spaced apart from the variable air chamber diaphragm 60 when the actuator 80 does not operate, thereby forming the variable air chamber 90. The fork 70 removes the variable air chamber 90 by being in close contact with the variable air chamber diaphragm 60 by the actuator 80. The fork 70 has a fork rod 71 connected with the actuator 80 through the center hole formed through the air chamber-forming surface of the channel nozzle plate 10-3a. The center hole of the channel nozzle cover 10-3b is an air supply hole 90-3 and has a larger diameter than that of the fork rod 71.

The actuator 80 operates in response to the control signal from the controller 100. When the actuator 80 operates, it stretches a fork connection rod 81 to move the fork rod 71, which is connected to the fork connection rod 81, to the variable air chamber diaphragm 60. Accordingly, as the actuator 80 operates, the fork 70 is brought in close contact with the variable air chamber diaphragm 60, thereby removing the variable air chamber 90. Further, the fork connection rod 81 and the fork rod 71 are coupled by fixing pins 83 which are fitted in a plurality of fixing holes 71a formed through the fork rod 71, such that a connection length of the fork connection rod 81 and the fork rod 71 can be adjusted. Further, the actuator 80 is disposed under the main diaphragm 30 inside the lower core 20-2. In particular, the actuator 80 is implemented by an electronic solenoid valve, and thus, the fork connection rod 81 functions as a stretching rod of the solenoid valve.

The variable air chamber 90 is formed by air flowing inside through the lower core 20-2 that communicates with the outside. Here, the variable air chamber 90 is connected with a fork air hole 90-1, an upper air storage 90-2, an air supply hole 90-3, a lower air storage 90-4, and an air intake hole 90-5, which form an air channel.

The fork air hole 90-1 is formed through a circular disc of the fork 70, a plurality of holes may be radially formed to have different diameters. The fork air hole 90-1 functions as a passage through which the air, which flows into the air intake hole 90-5, passes. The fork air hole 90-1 collects the air in the lower air storage 90-4, and then the air flows into the upper air storage 90-2 through the air supply hole 90-3 to the variable air chamber 90. Accordingly, as the variable air chamber 90 is filled with the air passing through the fork air hole 90-1, the fork 70 and the variable air chamber diaphragm 60 are maintained to be separated from each other, such that the variable air chamber diaphragm 60 elastically deforms to absorb the exciting force applied by the fluid in the upper fluid chamber 10-1.

The upper air storage 90-2 is stepped down on the channel nozzle plate 10-3a and has the air supply hole 90-3 at a center in which the fork rod 71 is fitted. The upper air storage 90-2 provides a space where the air flows into the air intake hole 90-5, is collected in the lower air storage 90-4, and then passes through the air supply hole 90-3. Therefore, the upper air storage 90-2 provides the space to temporarily collect the air before the air flows into the variable air chamber 90 after coming out of the fork air hole 90-1.

The air supply hole 90-3 is formed through the center of the upper air storage 90-2, so that the fork rod 71 is fitted and has larger a diameter than that of the fork rod 71. The air supply hole 90-3 provides a passage to collect the air in the lower air storage 90-4 through the air intake hole 90-5 to flow to the upper air storage 90-2.

The upper air storage 90-4 is formed under the main diaphragm 30 and above the actuator 80 in the internal space of the lower core 20-2. Accordingly, the lower air storage 90-4 provides a space for supplementing the air coming out through the air supply hole 90-3 through the air intake hole 90-5.

The air intake hole 90-5 is formed at the lower core 20-2 to communicate with the outside. Accordingly, the air intake hole 90-5 functions as a passage for taking air to collect in the lower air storage 90-4 from the atmosphere.

Figure 3A:
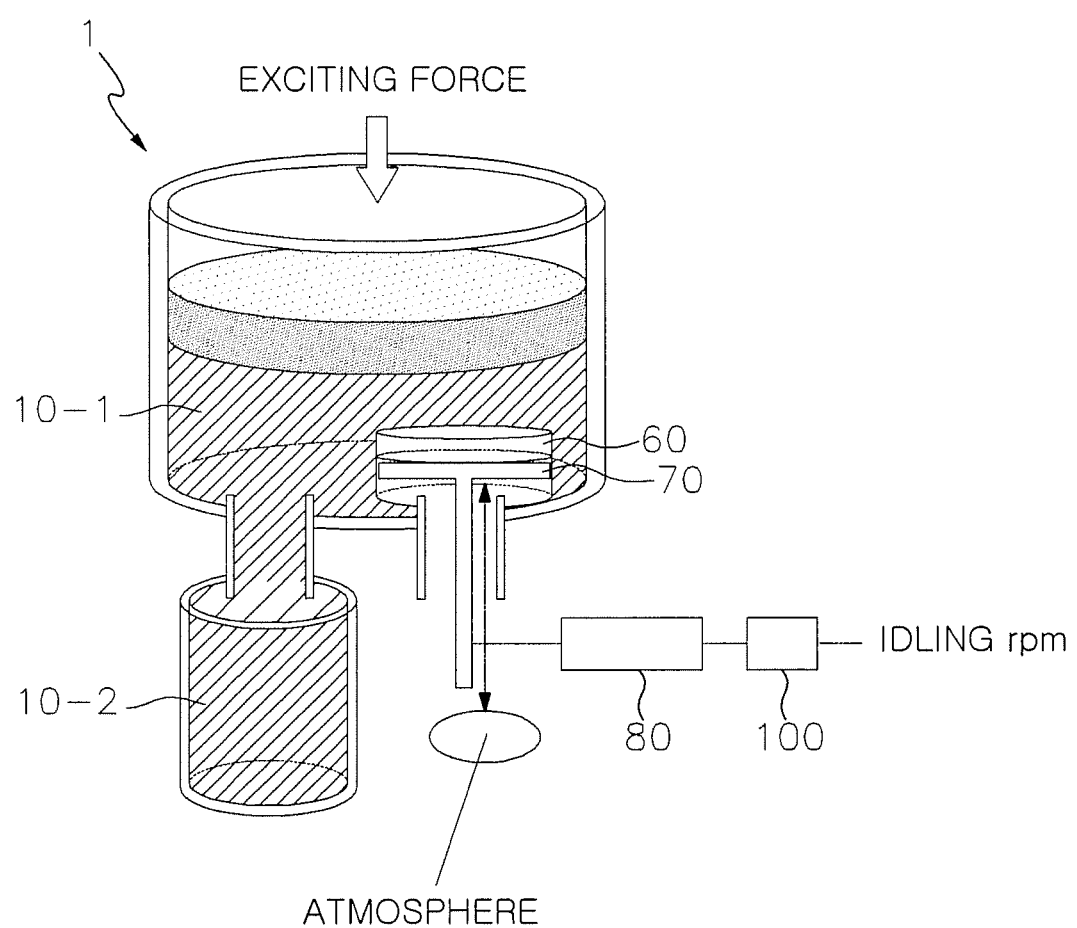
FIGS. 3A to 4 are views showing an operation and performance, respectively, of the electronic SAC engine mount with a variable air chamber in idling according to the present disclosure.
Figure 3B:
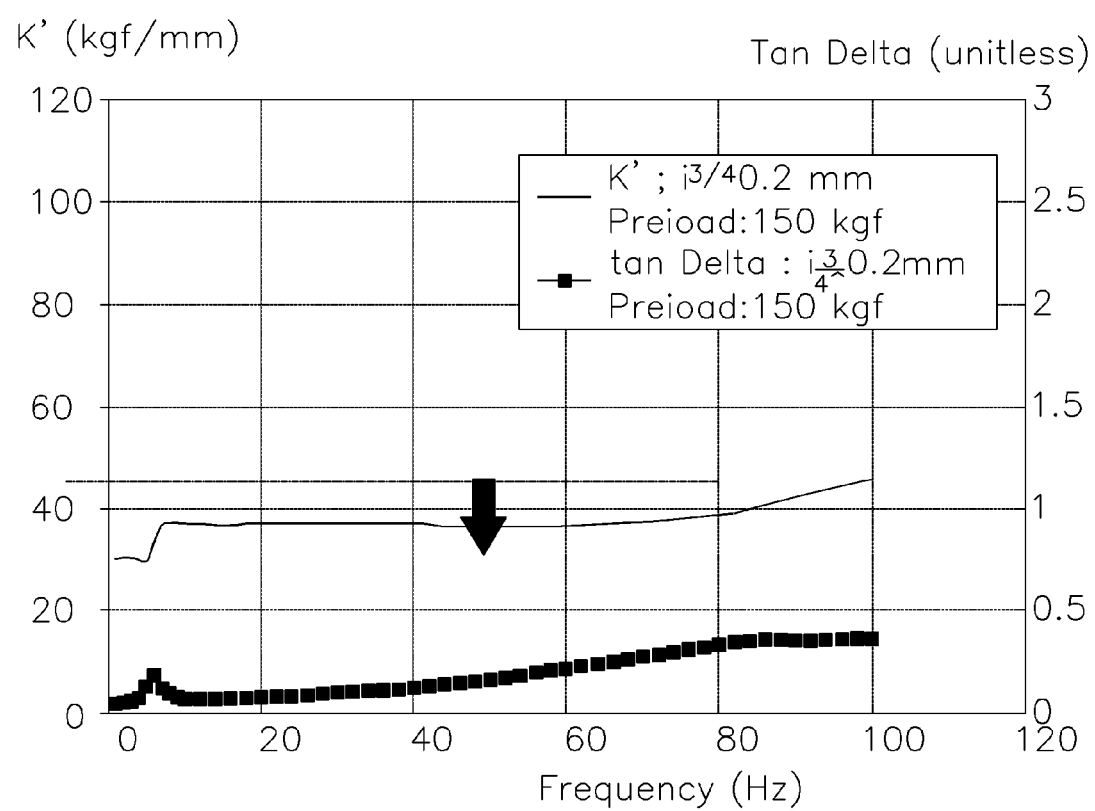
Figure 4:
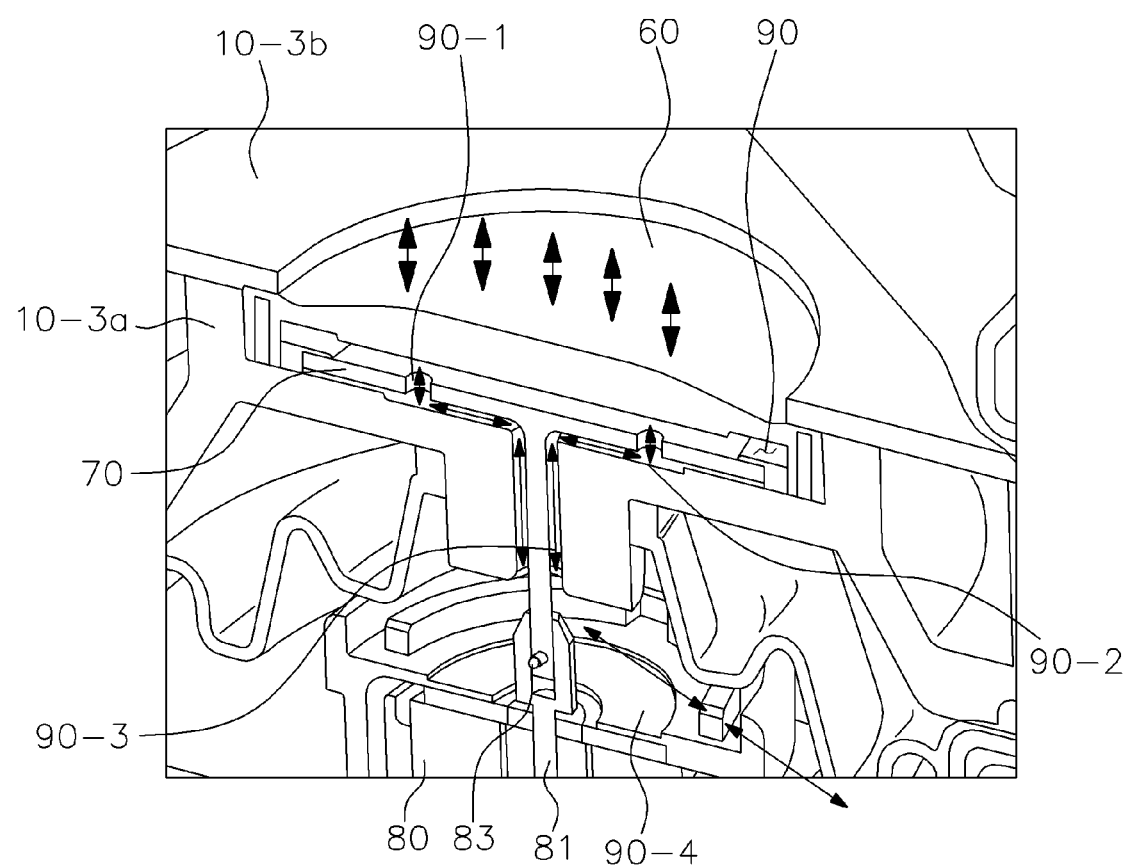

FIGS. 3A to 4 are views showing an operation and performance, respectively, of an electronic SAC engine mount with a variable air chamber according to the present disclosure in idling of a vehicle.

As shown in FIGS. 3A to 4, the controller 100 operates the electronic SAC engine mount 1 in accordance with idling of an engine, in which the actuator 90 is operated by an output from the controller 100 and pulls the fork connection rod 81, and the fork rod 71 fixed by the fixing pins 83 is pulled accordingly. The pulling means that the fork connection rod 81 is retracted into the actuator 80.

The fork 70 comes in close contact with the air chamber-forming surface of the channel nozzle plate 10-3a, except for the upper air storage 90-2 to form the variable air chamber 90 between the variable air chamber diaphragm 60 and the fork 70. Accordingly, the air is collected in the lower air storage 90-4 through the air intake hole 90-5 and passes through the air supply hole 90-3. Further, the air passing through the air supply hole 90-3 is temporarily collected in the upper air storage 90-2 and then flows into the variable air chamber 90 through the fork air hole 90-1.

Therefore, the air in the variable air chamber 90 supports the variable air chamber diaphragm 60 with its pressure and the variable air chamber diaphragm 60 supported by the pressure of the air is elastically deformed by the exciting force in the upper fluid chamber 10-1, such that the variable air chamber diaphragm 60 can move to absorb the exciting force.

As a result, the dynamic characteristics of the electronic SAC 1 are lowered, as indicated by the arrow on the frequency performance curve in FIG. 3B.

Figure 5A:
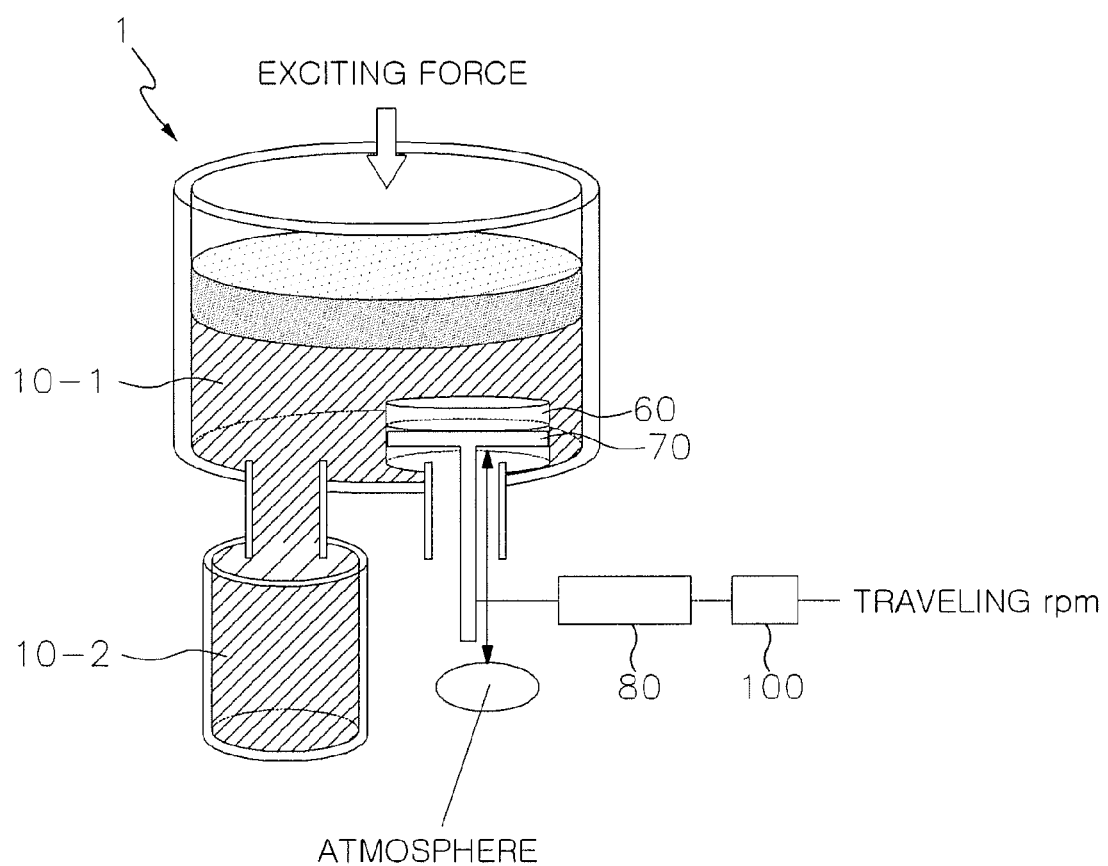
FIGS. 5A to 6 are views showing an operation and performance, respectively, of the electronic SAC engine mount with a variable air chamber in traveling according to the present disclosure.
Figure 5B:
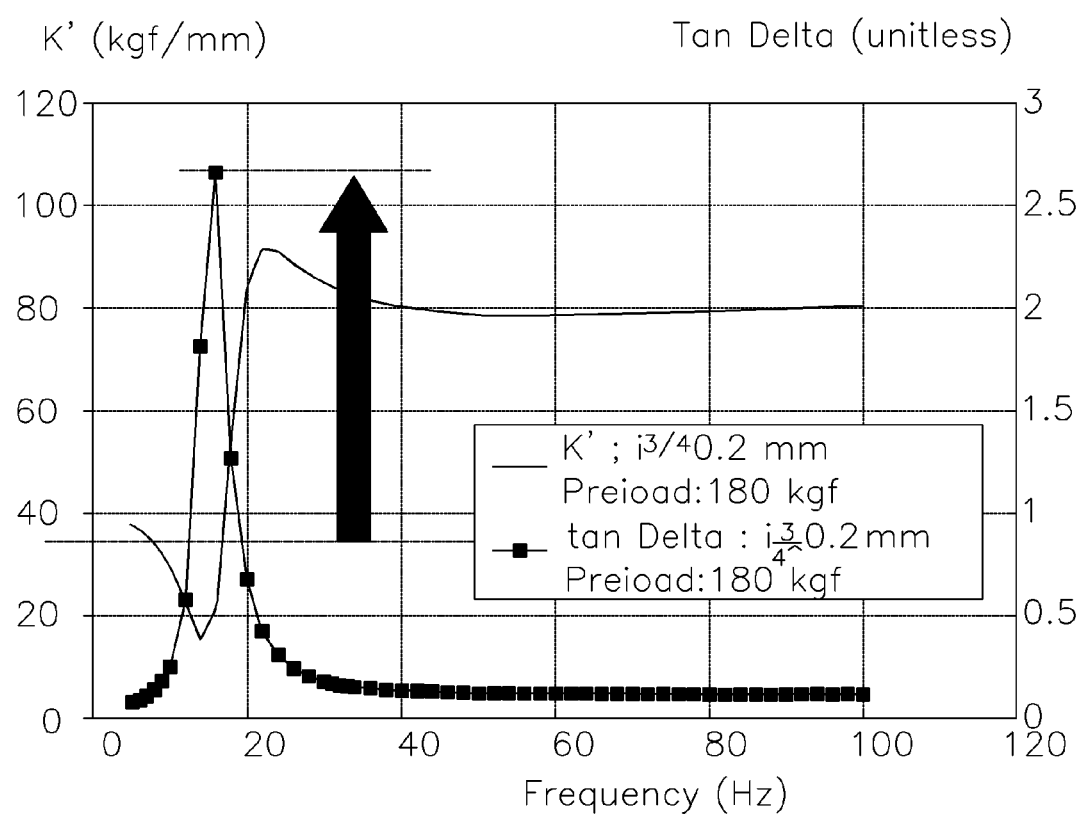
Figure 6:
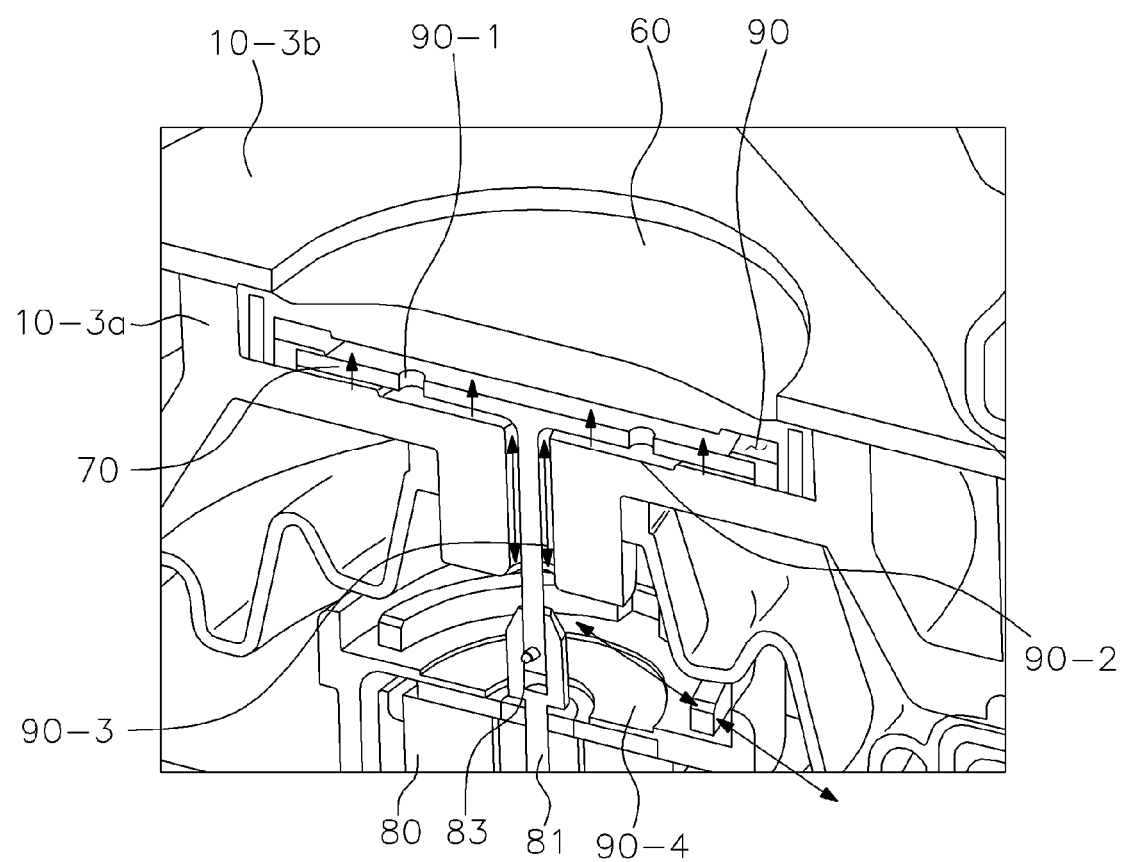

FIGS. 5A to 6 are views showing an operation and performance, respectively, of an electronic SAC engine mount with a variable air chamber according to the present disclosure in traveling.

As shown in FIGS. 5A to 6, the controller 100 operates the electronic SAC engine mount 1 in accordance with traveling of a vehicle, so the actuator 90 is operated by an output from the controller 100 and pushes the fork connection rod 81, and the fork rod 71, which is fixed by the fixing pins 83, is pushed accordingly. The pushing means that the fork connection rod 81 is stretched out from the actuator 80.

The fork 70 is spaced apart from the upper air storage 90-2 and brought in close contact with the variable air chamber diaphragm 60, so that the variable air chamber 90 formed between the variable air chamber diaphragm 60 and the fork 70 is removed. Accordingly, the air is collected in the lower air storage 90-4 through the air intake hole 90-5 and passes through the air supply hole 90-3. Further, the air passing through the air supply hole 90-3 is temporarily collected in the upper air storage 90-2 and then flows into the variable air chamber 90. However, since the fork air hole 90-1 is blocked by the variable air chamber diaphragm 60, the air cannot come out of the fork air hole 90-1.

The variable air chamber diaphragm 60 is not supported by the pressure of the air in the variable air chamber 90, but fixed by the fork 70. Thus, the diagraph 60 cannot elastically deform to absorb the exciting force applied by the fluid in the upper fluid chamber 10-1 and is fixed, so that most of the fluid in the upper fluid chamber 10-1 flows through the channel of the channel nozzle plate 10-3a.

As a result, a loss factor of the electronic SAC engine mount 1 is increased, as indicated by the arrow on the frequency performance curve in FIG. 5B.

As described above, since the electronic SAC engine mount 1 according to an embodiment of the present inventive concept includes: the variable air chamber diaphragm 60 absorbing the exciting force of fluid due to an external force by elastically deforming; the fork 70 separated from the variable air chamber diaphragm 60 to keep the variable air chamber 90 into which air flows in idling of an engine but being in close contact with the variable air chamber diaphragm 60 to remove the variable air chamber 90 into which air flows when a vehicle is driven; and an actuator 80 separating the fork 70 from the variable air chamber diaphragm 60 or being in close contact with the variable air chamber diaphragm 60, rate of change of dynamic characteristics and a loss factor at the equivalent level to those of a vacuum negative pressure SAC engine mount are achieved. In particular, the rate of change of dynamic characteristics and the loss factor are increased to driving conditions of the vehicle, thus improving the driving conditions.

The foregoing exemplary embodiments are only examples to allow a person having ordinary skill in the art to which the present inventive concept pertains (hereinafter, referred to as "those skilled in the art") to easily practice the present inventive concept. Accordingly, the present inventive concept is not limited to the foregoing exemplary embodiments and the accompanying drawings, and therefore, a scope of the present inventive concept is not limited to the foregoing exemplary embodiments. Accordingly, it will be apparent to those skilled in the art that substitutions, modifications, and variations can be made without departing from the spirit and scope of the invention as defined by the appended claims and can also belong to the scope of the present disclosure.

What is claimed is:

1. An electronic semi active control engine mount having a variable air chamber, comprising:
   a variable air chamber diaphragm that absorbs an exciting force of a fluid by elastically deforming, the exciting force caused by an external force;
   a fork that is separated from the variable air chamber diaphragm to keep an internal space of the variable air chamber into which air flows in idling of an engine and that comes in close contact with the variable air chamber diaphragm to remove the internal space of the variable air chamber into which the air flows when driving of a vehicle; and
   an actuator that either separates the fork from the variable air chamber diaphragm or brings the fork in close contact with the diaphragm,
   wherein the variable air chamber supports the variable air chamber diaphragm with an atmospheric pressure,
   wherein the fork is disposed under the variable air chamber diaphragm and the actuator is disposed under the fork,
   wherein the fork and the actuator are connected by fixing pins, and
   wherein the fixing pins fix a fork rod integrally formed with the fork and a fork connection rod retracting and stretching into and out of the actuator.

2. The electronic semi active control engine mount of claim 1, wherein the variable air chamber diaphragm is exposed to an upper fluid chamber to directly receive the exciting force of the fluid,
   the fork is disposed on an air chamber-forming surface recessed on a channel nozzle plate which forms a channel connected from the upper fluid chamber to a lower fluid chamber, and
   the actuator is disposed under the lower fluid chamber which is blocked by a main diaphragm.

3. The electronic semi active control engine mount of claim 2, wherein the upper fluid chamber is surrounded by an upper core with the channel nozzle plate for separating the fluid stored therein,
   the lower fluid chamber is surrounded by a lower core which is coupled to a lower portion of the upper core, and
   the lower core forms an internal space in which the actuator is disposed together with the variable air chamber diaphragm to communicate with outside.

4. The electronic semi active control engine mount of claim 3, wherein the lower core, the channel nozzle plate, and the fork form an air intake channel connected to the variable air chamber.

5. The electronic semi active control engine mount of claim 4, wherein the air intake channel includes a fork air hole formed in the fork, an upper air storage grooved in from the air chamber-forming surface of the channel nozzle plate, an air supply hole formed through a center of the air chamber-forming surface, a lower air storage between the variable air chamber diaphragm and the actuator, in the internal space of the lower core, and an air intake hole formed at the lower core and communicate with the outside.

6. The electronic semi active control engine mount of claim 5, wherein the fork air hole is provided in plural to have different diameters.

7. The electronic semi active control engine mount of claim 5, wherein the fork air hole collects the air in the lower air storage, and the collected air flows into the upper air storage through an air supply hole to the variable air chamber.

8. The electronic semi active control engine mount of claim 2, the variable air chamber diaphragm forms the variable air chamber using an air chamber flange of the variable air chamber diaphragm.

9. The electronic semi active control engine mount of claim 8, wherein the variable air chamber diaphragm is fixed by a channel nozzle cover, which divides an internal space of the electronic SAC engine mount by the upper and lower fluid chambers and is combined with the channel nozzle plate, with the air chamber flange on the air chamber-forming surface.

10. The electronic semi active control engine mount of claim 1, wherein the actuator is controlled by a controller which determines whether the engine is in an idling state or a vehicle is in a driving state based on an engine revolutions per minute (RPM).

11. The electronic semi active control engine mount of claim 10, wherein the actuator is a solenoid valve.

12. The electronic semi active control engine mount of claim 1, wherein variable air chamber diaphragm is made of a material absorbing the exciting force.

13. An electronic semi active control engine mount having a variable air chamber, comprising:

upper and lower fluid chambers connected to channels through which a fluid flows;

an upper core surrounding the upper fluid chamber and a lower core surrounding the lower fluid chamber;

a channel nozzle plate and a channel nozzle cover combined with each other to form channels connected to the upper and lower fluid chambers;

a main diaphragm separating an internal space of the lower core;

a mounting housing surrounding the upper and lower cores; and a variable air chamber unit having the variable air chamber to absorb an exciting force of the fluid in the upper fluid chamber during idling of an engine, and removing an internal space of the air chamber to form a flow of the fluid through which the fluid flows to the upper and lower fluid chambers during traveling of a vehicle;

wherein the variable air chamber unit includes a variable air chamber diaphragm that absorbs the exciting force by elastically deforming, so that a fork is disposed under the variable air chamber diaphragm and an actuator is disposed under the fork, wherein the fork and the actuator are connected by fixing pins, and wherein the fixing pins fix a fork rod integrally formed with the fork and a fork connection rod retracting and stretching into and out of the actuator.

14. The electronic semi active control engine mount of claim 13, wherein the fork is separated from the variable air chamber diaphragm to keep the variable air chamber into which air flows during the idling of the engine or comes in close contact with the variable air chamber diaphragm to remove the internal space of the air chamber into which air flows during the traveling of the vehicle; and the actuator that separates the fork from the variable air chamber diaphragm or brings the fork in close contact with the variable air chamber diaphragm, wherein the air chamber supports the variable air chamber diaphragm with an atmospheric pressure.

\* \* \* \* \*